INVENTORS
JOHN L. HALL & DOUGLAS A. ELLIOTT
BY Godfrey B. Spein
ATTORNEY

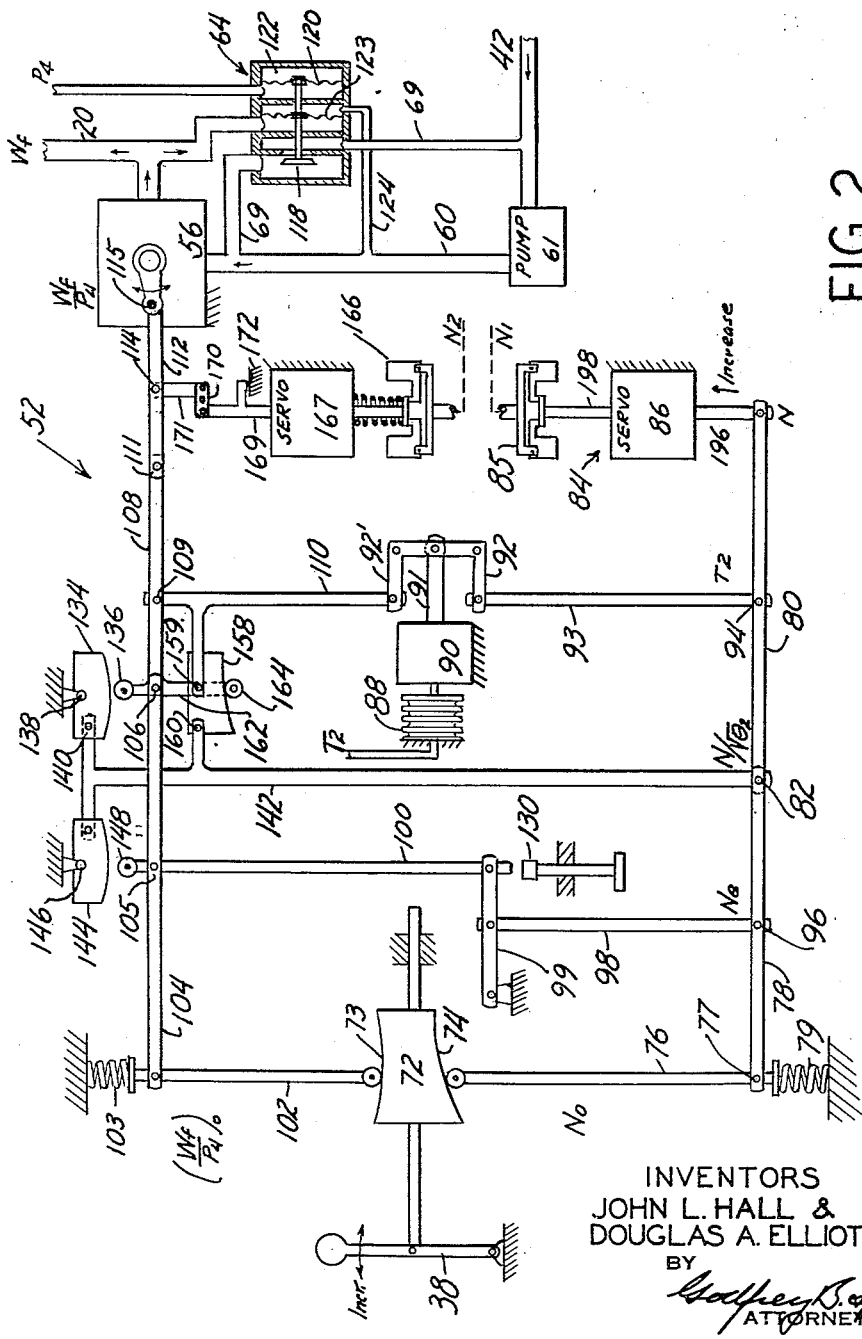

Nov. 22, 1960
J. L. HALL ET AL
2,960,826
COORDINATED FUEL AND SPEED SCHEDULING
CONTROL FOR GAS TURBINE ENGINES
Filed Dec. 6, 1954
3 Sheets-Sheet 3
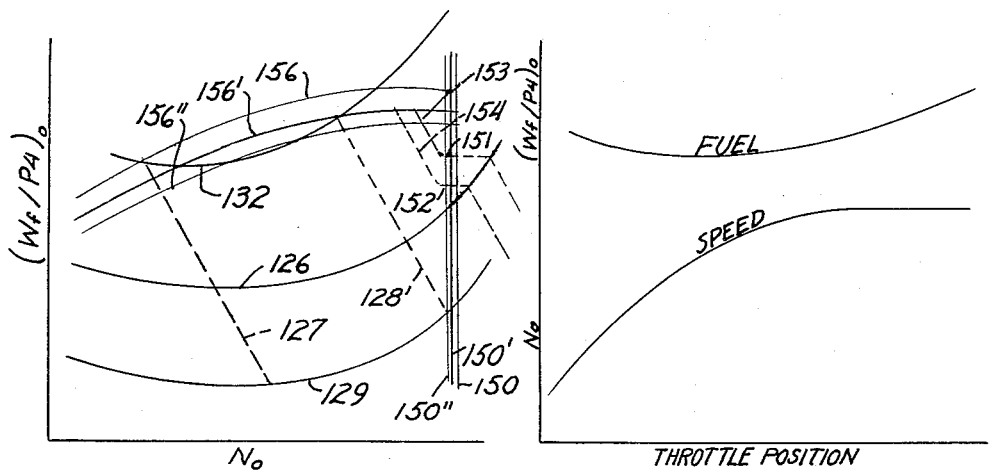
FIG. 5
FIG. 6
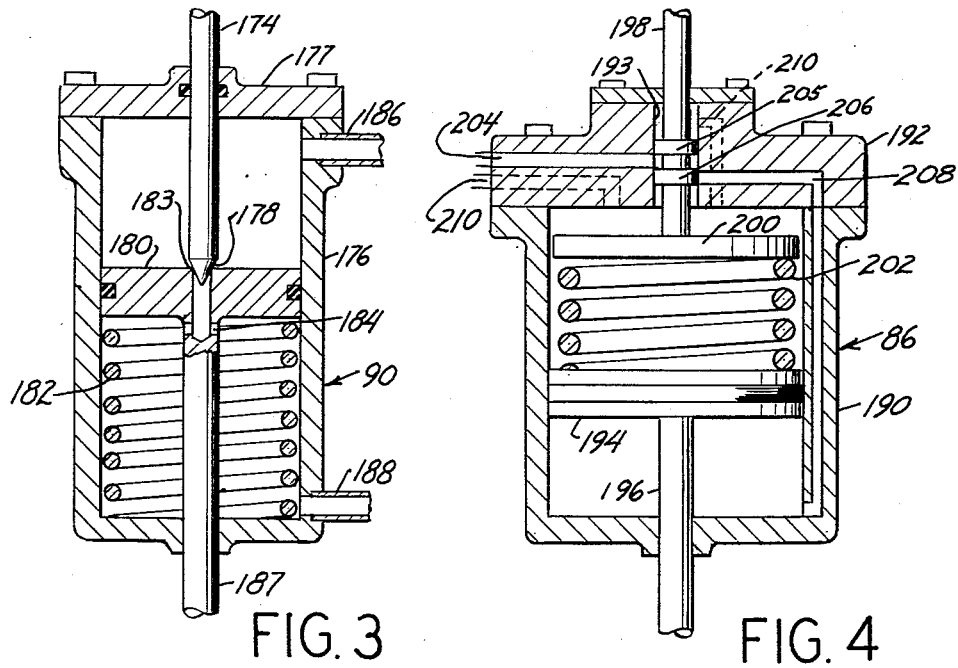
FIG. 3
FIG. 4
INVENTORS
JOHN L. HALL & DOUGLAS A. ELLIOTT
BY
*Godfrey B. Green*
ATTORNEY United States Patent Office 2,960,826
Patented Nov. 22, 1960

2,960,826

COORDINATED FUEL AND SPEED SCHEDULING CONTROL FOR GAS TURBINE ENGINES

John L. Hall, Hanover, and Douglas A. Elliott, Waldwick, N.J., assignors to Curtiss-Wright Corporation, a corporation of Delaware Filed Dec. 6, 1954, Ser. No. 473,068

2 Claims. (Cl. 60—39.28)

This invention relates to controls for gas turbines. It is applicable for use with jet producing gas turbines incorporating one or more compressor-turbine spools or rotors and is also adapted for use with jet turbines having variable area jet nozzles and an afterburner between the turbine and the nozzle.

The control system of the invention is based upon the broad concept of scheduling fuel and turbine speed according to throttle position for a standard set of operating conditions. Fuel-air ratio for steady state operation is scheduled by the throttle and the actual fuel delivered is modified by compressor discharge pressure and by non-standard operating conditions so that correct fuel is delivered to the engine without exceeding limiting conditions for engine operation. Such limiting conditions include the surge limit of compressor operation, turbine temperature, and turbine speed. Also, when decreased power is called for, certain minimum fuel feed is maintained to avoid flameout in the engine. The present control system includes a primary fuel valve which is adjusted by the throttle to pass fuel in proportion to a desired or calculated standard fuel-air ratio modified by current operating conditions. The pressure drop across the valve is modified according to compressor discharge pressure, whereby the fuel flow to the engine is in accordance with the desired calculated and modified value to provide optimum steady state operation, and to allow engine acceleration within tolerable limits.

Where the invention is used in a two-spool engine, provision is made to regulate or limit fuel to avoid either engine spool exceeding a tolerable maximum speed. Primary speed control of an engine rotor is preferably accomplished by governing the area of a variable area exhaust nozzle in accordance with the teachings of Hall, et al., application Serial Number 458,243, filed September 24, 1954. In the present invention, the variable area nozzle governing system is coordinated with the fuel control system whereby the speed of both the compressor turbine spools is held within proper limits. As was mentioned in said prior application, a variable area nozzle system and the governor therefor may effectively be used with an afterburner. The combination of afterburning fuel control in conjunction with fuel control for a main engine and a variable area nozzle control forms a part of the present invention.

An object of the invention is to provide a coordinated fuel control system for a jet engine. A further object is to provide an engine control combination which, through a single control lever, will provide main and afterburner fuel control in conjunction with speed control to enable engine operation within tolerable structural limitations from idling power through military power to maximum power obtainable by full main engine operation and full afterburner operation. A further object is to provide a main engine fuel control system of simplified characteristics wherein fuel and speed are scheduled according to a generalized or "standard atmosphere" condition of operation and wherein these fuel and speed demands are biased according to the actual atmospheric conditions under which the engine operates. A further object is to provide a main fuel control system which avoids the use of three dimensional cams for correction purposes and which resolves to a relatively simple system of linkages or their equivalent to adjust a main fuel valve in accordance with the relation of fuel feed rate divided by compressor discharge pressure. A further object is to finally establish main fuel flow to the engine by inserting a pressure drop across the valve as a factor of compressor discharge pressure, whereby the final fuel feed to the engine is in accordance with the engine requirements for the selected engine power. Other objects of the invention will become apparent as the detailed description proceeds.

An understanding of the details of the invention may be gained from reading the following description in connection with the drawings. In the latter, similar reference characters represent similar parts, and Fig. 1 is a schematic diagram of a turbine engine and a control system according to the invention, Fig. 2 is a diagram, in greater detail, of the fuel control system for the two-spool turbine engine, Fig. 3 is a sectional view of one of the servo units of Fig. 2

Fig. 4 is a sectional view of other servo units also shown in Fig. 2,

Fig. 5 shows curves of the control characteristics of the fuel control system, and Fig. 6 contains curves showing steady state speed and fuel flow against throttle position.

Figure 1:
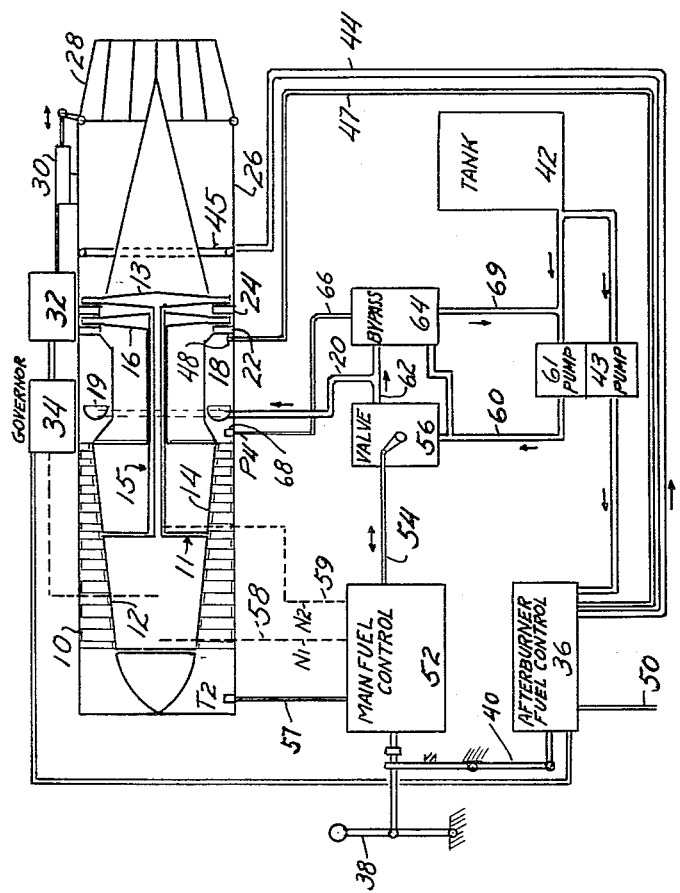

Referring to Fig. 1, we show a turbine engine 10 having a low pressure rotor 11 which includes a multi-stage axial flow compressor 12 driven by a turbine wheel 13. The compressor 12 feeds its output directly to a multistage axial compressor 14 forming part of a high pressure rotor 15, the compressor 14 being directly driven by a high pressure turbine wheel 16. The two rotors 11 and 15 may rotate freely relative to one another and are carried in suitable bearings, not shown. The compressor 14 feeds air to combustion chambers 18 equipped with fuel burners 19, the latter being fed with liquid fuel at a controlled rate from a manifold 20. A suitable ignition system, not shown, is provided to ignite fuel fed to the burners 19. Hot combustion products, which include an excess of unburned air, discharge rearwardly through a nozzle box 22 to impinge upon the blades of the turbine wheel 16. Gas discharge from the wheel 16 passes through another nozzle box 24 to impinge upon the blades of the turbine wheel 13. Residual hot gas flows through a tail pipe 26 and through a variable area nozzle 28 to the atmosphere in the form of a propulsive jet.

Area of the nozzle 28 is modified by one or more actuators 30 receiving power from a mechanism 32 which is controlled by a nozzle governor 34 which is drivably connected to one of the rotors. In accordance with said prior application, speed of the rotor 11 is controlled by adjustment of the area of the nozzle 28.

An afterburner fuel control is shown at 36. This is usually tied into the engine throttle 38 as by a link 40, in such a fashion that afterburner fuel flow is not initiated until advance of the lever 38 beyond the maximum power setting of the engine proper. The afterburner fuel control 36 receives fuel from a supply tank 42 through a pump 43 and del'vers it in proper quantities, through a manifold 44 to afterburner fuel nozzles 45 disposed in the tail pipe 26. The afterburner fuel control further provides igniter fuel for the afterburner through a conduit 47 which normally terminates in a nozzle 48 located upstream of the turbine wheels 13 and 16. The flow of afterburner fuel, when the afterburner is in operation, is controlled by the power lever setting and also in accordance with the ambient pressure due to altitude through an ambient pressure conduit 50 associated with the control 36, and additional parameters as are necessary. The afterburner control may also be interconnected with the governor 34, for instance, to provide afterburner ignition fuel shutoff upon establishment of full afterburner operation, to provide interaction for control stabilization if needed, or for other purposes.

The main fuel control is accomplished by a unit 52 to which the power lever 38 is connected and from which an operating connection 54 extends to a main fuel valve 56. Inputs to the fuel control 52 include a measurement of temperature of the air entering the engine, as shown at 57. Additional inputs to the fuel control 52 may include low-pressure spool speed, at 58, and high-pressure spool speed, at 59. The main fuel valve 56 is furnished with pressurized fuel through a conduit 60 from a pump 61 connected to the tank 42. Output from the valve 56 as regulated by fuel control 52 passes through a conduit 62 to the main fuel manifold 20 and also to a bypass valve 64. This latter regulates delivered fuel in accordance with compressor discharge pressure through a connection 66 to a pressure sensing device 68 located adjacent the output from the high pressure compressor 14. That fuel which is bypassed by the valve 64 is returned to the fuel tank or to the upstream side of the pump 61 through a conduit 69.

The afterburner fuel control 36 may include several components similar to valve 56, and bypass 64, to provide effective fuel metering.

It is well known that, for any selected power condition of engine operation, there may be a large number of values of jet thrust, engine speed and turbine temperature, depending upon ambient air temperature and pressure and aircraft speed. For instance, if a jet engine power lever is set for 90% power, this represents no specific value of engine thrust but rather 90% of the maximum engine thrust available under the then existing air speed and ambient air conditions.

However, if only one certain set of operating conditions should exist, such as in the sea level "standard atmosphere" established by NACA and United States Air Force specification, jet engine power may be scheduled according to throttle lever position and a finite set of conditions will result in respect to engine r.p.m., turbine temperature and jet thrust. Thus, for operation in the sea level standard atmosphere, a certain engine having known characteristics may be scheduled to specific fuel feed and r.p.m. to yield a determinate schedule of jet thrust.

When actual conditions of air temperature and pressure are sensed and related to corresponding sea level standard atmospheric conditions, correction factors or ratios (which are frequently termed "dimensionless" ratios) are produced which may be applied to correct the calculated standard atmosphere speed and fuel flow to values corresponding to those which are needed to produce a chosen percentage of available power under actual atmospheric conditions.

Topping limits for fuel flow are necessary in engine operation to avoid operation in regions of excessive r.p.m., compressor stall or surge, excessive turbine temperature and other items. Particularly during engine acceleration, topping limits are necessary. Furthermore, a lower limit for fuel feed is desirable, particularly under conditions of engine deceleration, to avoid possible flameout of the engine. These limits are fixed in terms of absolute values of speed and temperature, but when expressed in generalized form or in terms of fuel flow they vary with ambient air temperature conditions.

They may be established at the sea level standard atmosphere conditions and then are modified, according to the present invention, by the correction ratio to establish changeable limits according to the actual atmosphere.

The main fuel control of this invention is based upon fuel and speed scheduling according to the characteristics of a chosen engine type or model under generalized to standardized atmospheric conditions, after which the control quantities are modified by the ratio of actual to standard conditions to produce corrected fuel flow.

As will be seen, the control system schedules fuel flow to generalized or standard speed, and responds to speed errors within tolerable limits to cause greater or less fuel flow for engine acceleration and deceleration. Speed errors bring about modification in fuel flow to erase the speed error.

The following terms and symbols are used in the drawings and description and generally conform to accepted nomenclature set forth in military jet engine specifications.

$W_{fo}$ Rate of fuel flow, generalized schedule
$W_f$ Rate of fuel flow, corrected
$W_a$ Rate of air flow
$W_f/P_4$ Calculated ratio of fuel rate to compressor discharge pressure
$\left(\dfrac{W_f}{P_4}\right)_0$ Scheduled ratio of fuel rate to compressor discharge pressure
T0 Absolute temperature, standard atmosphere
T2 Absolute temperature, compressor inlet
T5 Absolute temperature, turbine inlet
$\theta_2$ Ratio $T2/T0$
N0 Compressor rotor scheduled r.p.m.
N Compressor rotor actual r.p.m., any rotor
N1 Compressor rotor actual r.p.m., low pressure
N2 Compressor rotor actual r.p.m., high pressure
P4 Compressor discharge pressure, absolute Reference may now be made to Fig. 2 which shows, schematically, the main fuel control 52 and associated components, including the main fuel valve 56 and the fuel bypass 64. The power lever or throttle 38 moves a member 72 having an upper fuel cam 73 and a lower speed cam 74, these being shaped to conform to the full schedule of $$\left(\dfrac{W_f}{P_4}\right)_0$$

and N0 respectively. The terms upper, lower, right and left are used for convenience in following the drawings only and have no significance in respect to possible realistic relations of the parts in an actual mechanism. A follower 76 for cam 74 is located vertically in proportion to a desired spool speed, the spool being the combination of a rotary, coupled turbine and compressor.

In the initial part of this explanation, the symbol N is used for spool speed in general. For the moment, it is immaterial whether the spool is that of a single spool engine or whether it is the high pressure or the low pressure spool of a multi-spool engine.

The follower 76 is linked at 77 to bar 78, the follower 76 being urged upwardly by a spring 79 to always engage the cam 74. The bar 78 at its rightward end is linked to a bar 80 at a pivotal connection 82.

The right end of the bar 80 is movable vertically and is positioned according to the actual value of N by a tachometer unit 84. This unit 84 comprises a governor 85 driven by the spool which controls a servo 86 to be described later in detail.

A device 88 connected to the compressor inlet senses compressor inlet temperature T2 (which varies with ambient temperature and ram) and energizes a servo unit 90 to be described in detail later, which has an output element 91. Element 91 is connected through bell crank 92 and link 93 to a pivot point 94 located at an intermediate position along the bar 80, thus locating the position of point 94 in accordance with T2 of $\theta_2$, a linear function thereof. By appropriate design of the linkage, which may include additional structure, the position of point 94 may be located according to $\sqrt{\theta_2}$. Thus, point 82 is located in accordance with the ratio $N/\sqrt{\theta_2}$, which is the same as N actual modified to the standard atmospheric conditions.

A point 96 between the ends of the bar 78 will, from the above structure, assume a position dependent on the values of N0 and $N\sqrt{\theta_2}$. If $\theta_2$ is 1 and if N0 and N are the same, there is no speed error. If N0 and N are different, or if $\theta_2$ is different from 1 while N0 and N are the same, point 96 is positioned according to the speed error N$e$. This position is carried upwardly by links 98, 99 and 100.

Fuel cam 73, as was mentioned, is formed in accordance with desired scheduled values of $$\left(\frac{W_f}{P_4}\right)_0$$

as derived from the characteristics of the particular engine for which the system is designed. This term, in general, is a good approximation of fuel-air ratio which is more precisely represented by the expression $W_f/W_a$. Variations in the term $$\left(\frac{W_f}{P_4}\right)_0$$

are accurate and effective criteria of turbine temperature T5.

In the present state of the art, there appears to be no accurate and rugged means for sensing turbine temperature, which is of the order of 1900° Rankine to 2200° Rankine (absolute temperature according to the Fahrenheit scale) so that sensing and scheduling or sensing of fuel-air ratio is used as a satisfactory substitute for the scheduling or sensing of turbine temperature. If and when a satisfactory temperature sensor becomes available, a system of the sort herein disclosed can readily be modified to use it.

A vertically guided follower link 102, pressed against cam 73 by a spring 103, is vertically positioned according to the contour of cam 73 to call for a certain schedule of $$\left(\frac{W_f}{P_4}\right)_0$$

To the upper end of follower 102, a bar 104 is linked, the bar having an intermediate pivot 105 connected with the N$e$ link 100. The rightward end 106 of bar 104 is located vertically at a position corresponding to $$\left(\frac{W_f}{P_4}\right)_0$$

as modified by existing speed errors N$e$. Bar 104 is coupled to the left end of another bar 108 at point 106. Bar 108 has an intermediate pivot 109 coupled to a link 110 positioned by the T2 servo unit 90. The bellcrank 92¹ and the link 110 correct the position of bar 108 by the value of $\theta_2$ by suitable linkage design, so that the right end 111 of the bar 108 assumes a position corresponding to the desired value of $W_f/P_4$ in accordance with actual, rather than standard, atmospheric conditions. Point 111 is pivoted to a rocker 112 having a normally fixed intermediate pivot 114, the end of the rocker being pivoted at 115 to the main fuel valve 56. The valve 56 is adjusted in area according to the desired actual value of $W_f/P_4$.

In the conversion from standard to actual conditions, the pressure correction factor does not appear, as it cancels out in the mathematics which is involved.

It is now necessary to regulate the pressure drop across valve 56 so that the desired fuel $W_f$ will be delivered. Fuel flow is proportional to area of the valve 56, multiplied by a function of the pressure drop across it. Since the valve area is proportional to $W_f/P_4$, if pressure drop is made proportional to the $P_4$ function, the final flow through the valve will be proportional to $W_f$. Thus, regulation of the pressure drop across valve 56 according to $P_4$, produces the desired effect. No further corrections are necessary for airspeed or compressor pressure rise, as these quantities are comprehended in the value of $P_4$. The bypass regulator 64 regulates pressure drop across valve 56 by a bypass valve 118, which bleeds fuel from the line 60 to a low pressure point through line 69.

Valve 118 is urged to a closing position by compressor discharge pressure acting on a diaphragm 120. The opposite side of diaphragm 120 forms a wall of an evacuated cavity 122 by which compressor discharge pressure becomes absolute pressure. The valve closing force from $P_4$ is balanced by the actual pressure drop across valve 56, this force being applied from a diaphragm 123 connected at its right side to pump pressure by a conduit 124 and on its leftward side to the manifold 20. The diaphragm 123 provides follow up on the valve 118, to hold valve position at such an opening that pressure drop across valve will hold correct proportion to $P_4$.

The system as described thus far takes into account the normal regulation of fuel to the jet engine but has not taken into account limiting conditions. Referring to Fig. 5, we show characteristic generalized curves plotted with respect to $N_0$ and $$\left(\frac{W_f}{P_4}\right)_0$$

the curve 126 showing the steady state condition for standard atmosphere. Curves 127 and 128 are proportional gain relations of $W_f/P_4$ to $N_e$ for a throttle setting at point where 127 or 128 intersect 126 and show the relation of N and $W_f/P_4$ during accelerating and decelerating transients. When deceleration is called for, $W_f/P_4$ must be limited to a minimum value. A transient overspeed calls for reduction in $W_f/P_4$, and this reduction is limited to still allow enough fuel flow to prevent flameout, generally along the line 129 in Fig. 5. This limit may be established by a fixed or semi-fixed stop 130 which may be engaged at times by the link 100 when the system is at a large overspeed value. This prevents reduction in $W_f/P_4$ below the desired limit.

Referring again to Fig. 5, curve 132 represents the surge limit for proper compressor operation under standard conditions. This surge limit is reproduced in a cam 134 shown in Fig. 2 which may at times be engaged by a follower 136 secured to a boss on one of the bars 104 or 108 at the pivot point 106. Upon drastic increase in fuel due to underspeed, fuel increase is limited by follower 136 engaging cam 134 enforcing limitation of engine operation to a level below the compressor surge limit. The surge limit represented by curve 132 in Fig. 5 matches the variation in surge with $N/\sqrt{\theta_2}$. The cam 134 is pivoted at 138 to a fixed member and is also pivoted at 140 to an adjusting rod 142 connected at its lower end to the pivot 82. Since the pivot 82 is positioned according to the value $N/\sqrt{\theta_2}$, change in this value will modify the position of the cam 134 and thereby modify the top limit to which fuel flow may be adjusted, holding the compressor below surge or stall operation.

In somewhat the same fashion, a maximum limit on accelerating fuel feed is imposed through a cam 144 movable on a fixed pivot 146 and also adjusted by the member 142. The cam 144 is engageable at times with a follower 148 secured to the speed error links 96 and 100. With this arrangement the value of accelerating fuel feed is limited with consequent diminution of fuel to inhibit excessive acceleration in the region of speed near maximum. The cam 144 is profiled to limit accelerating fuel to avoid conflict with exhaust nozzle control in regulating speed in this region. If excessive overspeed should occur for any reason, the cam 144 does not interfere with a reduction in fuel to restore scheduled speed.

The design speed limit is shown in Fig. 5 by the family of lines 150, 150' and 150". They all represent the same absolute speed, but are variable in terms of generalized speed $N_0$. The cam 144 is profiled to bring about no allowance for fuel increase due to underspeed at the regions 151 and 152 but to allow limited fuel increase due to underspeed when turbine speed is in the range 153 and 154. When operation of the turbine is in the regions 151 and 152, the engine is near maximum speed and further fuel increase to develop required thrust without increase in turbine speed is attained through an increase in throttle setting and simultaneous compensation by the exhaust nozzle 28. In effect, the cam 144 applies a mechanical stop to the point in the linkage at which $W_f/P_4$ is computed, and speed error is locked out as an influencing factor on fuel rate during maximum speed engine operation. Maximum speed is precisely controlled by the governor actuated exhaust nozzle 28 of Fig. 1.

At times, turbine temperature T5 may create a limiting factor for fuel rate for acceleration. These temperature limits are represented by a family of curves 156, 156' and 156". Each of these establishes a tolerable transient value of $W_f/P_4$ with respect to $N/\sqrt{\theta_2}$. Also, a different one of these curves is applicable for various values of T2. Some fixed value of T5, say 2200R, is represented by the curve family 156. To establish the T5 limit for $W_f/P_4$ a limit cam 158 is provided, which is shifted in position according to T2 by the link 110 by a pivotal connection 159. This, in effect, adjusts the limit for the transient tolerable T5 according to the appropriate curve 156, etc.

In addition, the cam 158 is rotated or adjusted by a connection 160 to the link 142 which moves according to $N/\sqrt{\theta_2}$. Cam 158 may be engaged at times by a follower 164 carried by an arm 162 secured to one of the bars 104 or 108 at the pivot 106. When the follower 164 engages the pre-positioned cam 158 $W_f/P_4$ is limited to a value which will prevent T5 from becoming excessive.

The system has been generally described with respect to rotor speed N. In an engine having two compressor-turbine spools, their speeds are designated N1 and N2. We may apply the fuel control system so that tachometer 84 measures N1, and so that the variable nozzle governor responds to N1 for accurate control of the low-pressure spool. High-pressure spool speed N2 generally follows N1 and ordinarily needs no specific governing. However, a limiter for engine fuel, responsive to excessive N2, is preferably included in the system. For this purpose an N2 speed responsive device 166 is used with a suitable servo 167, the output of the latter being connected through a rod 169, a lever 170 and a support 171. The pivot 114 is on the support 171. A stop 172 blocks the servo rod 169 and thus the pivot 114 against position change for values of N2 less than maximum but on N2 overspeed, pivot 114 moves in a direction to reduce $W_f/P_4$. The servo 167 may be of the character of that shown in Fig. 3. Alternatively to the above, there are various combinations of high and low pressure spools with the variable exhaust nozzle governor, the tachometer 84 and the speed responsive device and servo 166, and the invention is intended to include such combinations in addition to the one specifically described. The following relations are feasible:

| Nozzle 28 | Tachometer 84/Cam 74 | Device 166/Servo 167 |
| --- | --- | --- |
| Related to: | | |
| N1 | N1 | N2 |
| N2 | N2 | N1 |
| N1 | N2 | N1 |
| N2 | N1 | N2 |

Fig. 3 shows a possible construction for the temperature servo 90. Therein, a temperature sensitive axially movable rod 174 is the input member and is position controlled by the bellows 88 (Fig. 2).

This rod enters a housing 176 through a sealed cover 177 and has a valve end 178. The housing contains a piston 180 elastically urged toward the rod 178 by a spring 182, the piston having a valve seat 183 leading to passages 184 on the spring side of the piston (the lower side as shown). Pressurized hydraulic fluid is fed to the top of the piston at 186. The piston includes an output rod 187 positioned according to the position of the rod 174. When rod 174 moves either up or down, hydraulic fluid passes through passages 184 or is held from such passage, whereby either the spring or the fluid exerts force to move the output rod 187. When rod 174 remains stationary, hydraulic pressure above piston 180 balances spring force, the aperture between the valve 178 and seat 183 adjusting itself to maintain such balance. Excess fluid passes from housing 176 through a conduit 188.

Fig. 4 shows a practicable form of tachometer servo 86, the same mechanism being usable in the tachometer 166. Herein, a cylinder housing 190 has a cover 192 including a valve bore 193 and several fluid ports. Cylinder 190 contains a slidable piston 194 having an output rod 196. An input valve stem 198 passes through the bore 193 and terminates within the cylinder in a spring abutment 200. Between the latter and the piston 194 is a spring 202. Pressurized hydraulic fluid enters the cover 192 through a port 204, which opens to the valve bore 193 at a point normally between two lands 205 and 206 on the valve stem 198.

When the stem moves down, fluid passes to and through a port 208 leading to the bottom of cylinder 190, forcing the piston 194 upwardly, compressing spring 202 and exerting force on stem 198 tending to close off port 208. When valve stem 198 moves upwardly, port 208 is opened to drain through a port 210, unloading fluid from below piston 194 and reducing the force of spring 202 on the valve stem, permitting the valve to close and stabilizing piston 194 at a new position. When piston 198 is the output element of a centrifugal governor as shown in Fig. 2, the piston 194 will assume an axial position in accordance with the rotational speed of the governor flyweights, and the flyweights will always stabilize in the same position regardless of r.p.m. This comes about since the piston 194 is arranged to exert the needed force on spring 202 to compensate the axial force on the stem 198 due to the flyweights.

The servo mechanisms of Figs. 3 and 4 are shown as feasible mechanisms to accomplish the required functions, but other types of devices serving analogous functions may be used where required in the control system.

While one embodiment illustrating the invention has been shown and described, it is to be understood that the invention may take other and various forms. Changes may be made in the arrangements without departing from the spirit of the invention. Reference should be made to the appended claims for definitions of the limits of the invention.

What is claimed is:

1. In a control system for a gas turbine engine including a compressor forming part of a rotor, coincidentally operable members to schedule $W_f/P_4$ and N wherein $W_f$ is fuel rate, $P_4$ is compressor discharge pressure and N is rotor rotational speed and wherein the scheduling is according to a selected environment for engine operation, means to measure actual rotor speed, means to modify the measurement of actual speed to its equivalent for the selected environment, means to compare scheduled speed and the modified speed measurement productive of a speed error signal, means to increase and decrease the scheduled value of $W_f/P_4$ according to underspeed and overspeed error signals respectively, means to modify the $W_f/P_4$ value according to actual temperature of air acted on by said compressor, a fuel valve controlled in area according to corrected $W_f/P_4$, a supply of fuel for said engine passing through said valve to said engine, means to limit increase of $W_f/P_4$, a secondary engine rotor, means to measure secondary rotor speed, said limiting means including a cam movable according to secondary rotor speed and shaped to define tolerable limiting speeds of which $W_f/P_4$ may not be increased in a direction to increase secondary rotor speed.

2. In a control system for a gas turbine engine including a compressor forming part of a rotor, coincidentally operable members to schedule $W_f/P_4$ and N wherein $W_f$ is fuel rate, $P_4$ is compressor discharge pressure and N is rotor rotational speed and wherein the scheduling is according to a selected environment for engine operation, means to measure actual rotor speed, means to modify the measurement of actual speed to its equivalent for the selected environment, means to compare scheduled speed and the modified speed measurement productive of a speed error signal, means to increase and decrease the scheduled value of $W_f/P_4$ according to underspeed and overspeed error signals respectively, means to modify the $W_f/P_4$ value according to actual temperature of air acted on by said compressor, a fuel valve controlled in area according to corrected $W_f/P_4$, a supply of fuel for said engine passing through said valve to said engine, means to regulate the pressure drop across the said valve in proportion to actual compressor discharge pressure, a secondary engine rotor, means to measure secondary rotor speed, said limiting means including a cam movable according to secondary rotor speed and shaped to define tolerable limiting speeds over which $W_f/P_4$ may not be increased in a direction to increase secondary rotor speed.

References Cited in the file of this patent

UNITED STATES PATENTS

| | | |
|---|---|---|
| 2,675,674 | Lee | Apr. 20, 1954 |
| 2,693,081 | Russ | Nov. 2, 1954 |
| 2,703,961 | Harding | Mar. 15, 1955 |
| 2,779,422 | Dolza | Jan. 29, 1957 |

FOREIGN PATENTS

| | | |
|---|---|---|
| 646,780 | Great Britain | Nov. 29, 1950 |